(12) United States Patent
Panjwani

(10) Patent No.: US 11,645,500 B2
(45) Date of Patent: May 9, 2023

(54) METHOD AND SYSTEM FOR ENHANCING TRAINING DATA AND IMPROVING PERFORMANCE FOR NEURAL NETWORK MODELS

(71) Applicant: Robust Machines, Inc., San Jose, CA (US)

(72) Inventor: Dileep Panjwani, San Jose, CA (US)

( * ) Notice: Subject to any disclaimer, the term of this patent is extended or adjusted under 35 U.S.C. 154(b) by 826 days.

(21) Appl. No.: 16/702,442

(22) Filed: Dec. 3, 2019

(65) Prior Publication Data

US 2021/0166105 A1    Jun. 3, 2021

(51) Int. Cl.
  *G06N 20/00*  (2019.01)
  *G06N 3/04*  (2023.01)
  *G06N 3/08*  (2023.01)
  *G06F 17/18*  (2006.01)
  *G06N 5/02*  (2023.01)

(52) U.S. Cl.
  CPC .......... *G06N 3/0481* (2013.01); *G06F 17/18* (2013.01); *G06N 3/08* (2013.01); *G06N 5/02* (2013.01); *G06N 20/00* (2019.01)

(58) Field of Classification Search
  None
  See application file for complete search history.

(56) References Cited

U.S. PATENT DOCUMENTS

2019/0258934 A1*  8/2019  Sorokin ................... G06N 3/04

* cited by examiner

*Primary Examiner* — David R Vincent
(74) *Attorney, Agent, or Firm* — Dileep Panjwani

(57) ABSTRACT

The present disclosure provides a system for improving performance of a neural network model. The system receives the neural network model and a training data associated with the neural network model. In addition, the system examines a first plurality of neuron activations inside the neural network model for the training data. The system examines the first plurality of neurons for creating a statistical profile of the first plurality of neuron activations. Further, the system receives a new set of data samples to improve the neural network model. Furthermore, the system examines a second plurality of neuron activations of each new sample of the new set of data samples. Moreover, the system extracts one or more data samples from the new set of data samples with largest novelty measurements. Also, the system adds the extracted one or more samples to the training data for re-training of the neural network model.

20 Claims, 5 Drawing Sheets

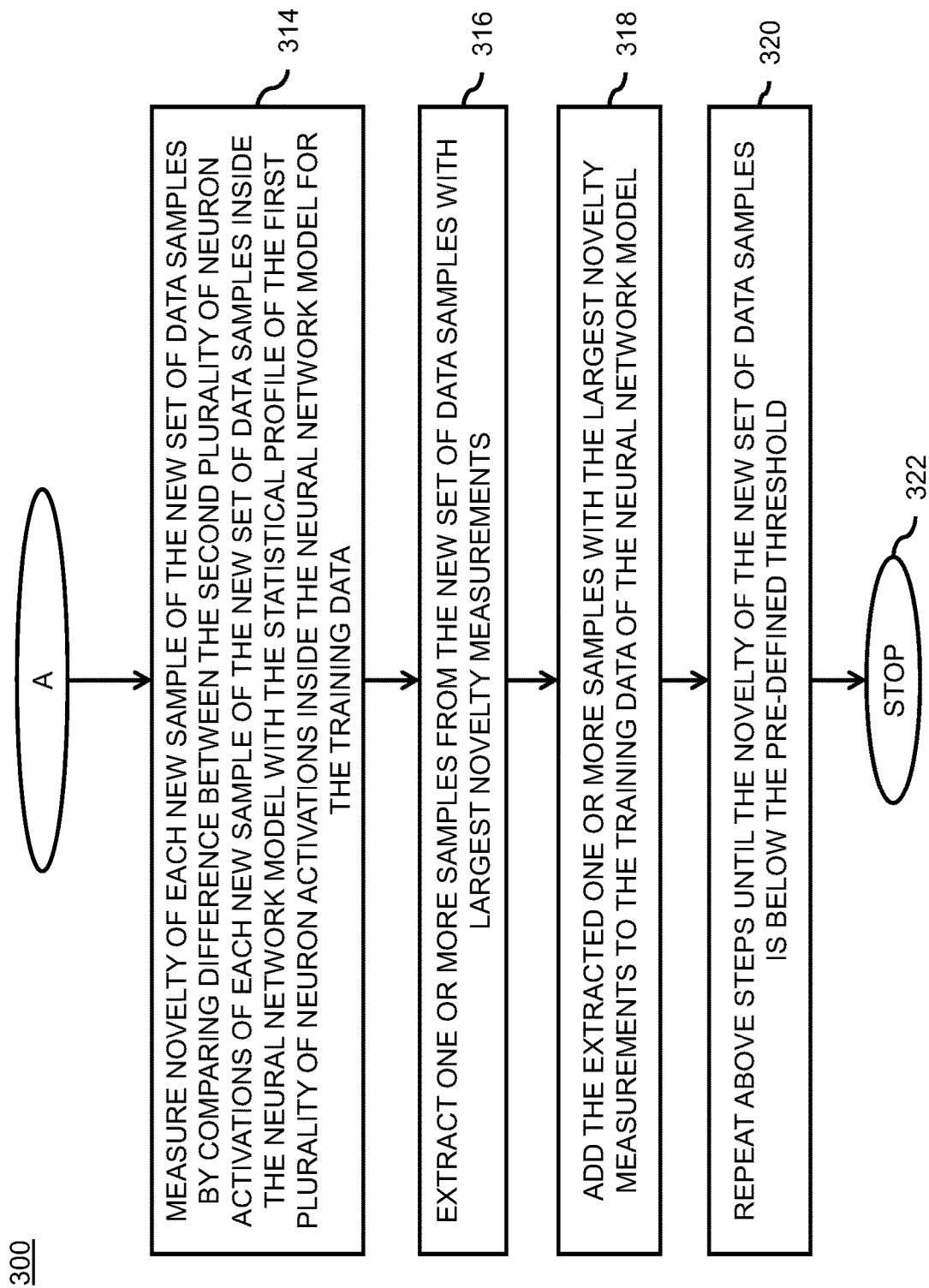

METHOD AND SYSTEM FOR ENHANCING TRAINING DATA AND IMPROVING PERFORMANCE FOR NEURAL NETWORK MODELS

The present disclosure relates to the field of artificial intelligence modeling, and in particular, relates to a method and system for improving training data and performance for a neural network model.

INTRODUCTION

Deep neural networks (DNNs) have proven to be powerful machine learning models and have achieved the best performance in various domains such as computer vision, speech, bioinformatics, etc. This discovery has led to widespread adoption of DNNs in applications such as self-driving cars, malware detection, and aircraft collision avoidance system. However, in machine learning model development, data scientists face two major problems. First, when data scientists build a new machine learning model, the challenge is to build or select a good quality training dataset which can generalize well and represents the behavior of the real world data comprehensively so that when the trained model is deployed in production, it provides same performance as seen during the training. The second problem is that once the machine learning models are deployed in production (real world use), their performance degrades with time because the probability distribution of the real-world data keeps changing with time.

When a data scientist develops a deep learning neural network model, he initially builds a training dataset, which is used to train the model. Often, methods such as random sampling or other similar methods are used to select a subset of all the available data. For supervised learning, this selected data is labeled, which is time consuming and expensive process. The challenge is that the data scientist cannot predict that the selected training data will generalize well. Hence, it becomes difficult to predict its performance once it is deployed in real world use.

The properties and probability density distribution of data in real use may differ or change from the data used for training a neural net/deep learning model. To address this issue, the training data is regularly enhanced by sampling a small portion of the data from the real use to retrain the model. If the success criteria for the model can be measured during real world use, then it's possible to easily extract data for which the model is not performing in the real world. However, for the majority of the applications, it is not possible to determine the success and hence the selection of the data in real use is based on either random sampling or low confidence seen in the inference result. For instance, it will not be practical to measure the success of every object recognized or decision taken by an autonomous car. This data sampling process is repeated periodically to maintain the model performance. There are many weaknesses of this method to maintain a DNN model. First, the random sampling of the data may not capture all the new types of data that was observed in the real-world use, and the training data may continue to be imperfect. Second, the model often fails in corner cases, and this method does not allow us to extract all the corner cases that are seen in the real-world use. Finally, this approach also does not tell us how much more new data should be added to the training dataset for retraining. Further, for mission-critical applications such as autonomous car, there is a need to continuously improve the deep learning neural net model by enhancing its design and labeled training data. The quality of labeled training data becomes of utmost importance. Given a labeled dataset, the challenge is what newer labeled data should be added to improve the overall quality of supervised or semi-supervised learning. It's also important to understand the characteristics of the new data for which the model is making the most mistakes, so its design can be further improved. The proposed method and system addresses the issues with maintaining good performance for neural network models in production.

SUMMARY

In a first example, a computer-implemented method is provided. The computer-implemented method improves robustness and accuracy of training of a neural network model. The computer-implemented method improves performance of the neural network model. The computer implemented method includes a first step to receive the neural network model and a training data associated with the neural network model at a novelty based machine learning system with a processor. The computer-implemented method includes another step to examine a first plurality of neuron activations inside the neural network model for the training data at the novelty based machine learning system with the processor. The computer-implemented method includes another step to create a statistical profile of the first plurality of neuron activations inside the neural network model for the training data at the novelty based machine learning system with the processor. The computer-implemented method includes yet another step to receive a new set of data samples to improve the neural network model at the novelty based machine learning system with the processor. The computer-implemented method includes yet another step to examine a second plurality of neuron activations of each new sample of a new set of data samples inside the neural network model at the novelty based machine learning system with the processor. The computer-implemented method includes yet another step to measure the novelty of each new sample of the new set of data samples by comparing the difference between the second plurality of neuron activations of each new sample of the new set of data samples inside the neural network model with the statistical profile of the first plurality of neuron activations inside the neural network model for the training data at the novelty based machine learning system with the processor. The difference in activations of the second plurality of neuron activations compared to the statistical profile of the first plurality of neuron activations is used as measure of novelty of the new set of samples. The computer-implemented method includes yet another step to extract one or more samples from the new set of data samples with largest novelty measurements at the novelty based machine learning system with the processor. The extracted one or more samples are labelled in case of supervised learning. The extracted one or more samples are not labelled in case of unsupervised learning. The computer-implemented method includes yet another step to add the extracted one or more samples to the existing training data for the neural network model. The computer-implemented method includes yet another step to re-train the neural network model using the enhanced training data that includes the extracted one or more samples with the highest novelty measurements. The performance of the neural network model improves and novelty measurement of the one or more data samples drops once the neural network model is created using the enhanced training data. The above steps are repeated until the novelty of the new set of data samples is below a pre-defined threshold. Once novelty of new samples drops, repeating the above process no longer improves the performance of neural network model. The method outlined above leads to significant improvement in performance and robustness of the neural network model in real world use.

In an embodiment of the present disclosure, the training data is received in one or more formats. The one or more formats include at least one of metric data, text, images, videos, gif and animation.

In an embodiment of the present disclosure, the new set of data samples are received in one or more formats. The one or more formats include at least one of metric data, text, images, videos, gif and animation.

In an embodiment of the present disclosure, the training data is received from one or more sources. The one or more sources include at least one of an enterprise data source, IOT devices, an application, a third-party database, one or more online knowledgebase, one or more offline knowledgebase, an input device, a scanner, and a hardware computing device.

In an embodiment of the present disclosure, the training data is received using random sampling from a dataset. The random sampling includes simple random sampling, stratified sampling, cluster sampling, multistage sampling, and systematic random sampling.

In an embodiment of the present disclosure, the novelty based machine learning system with the processor includes a subset of the second plurality of neuron activations in the novelty measurements of each new sample of the new set of data samples. The subset is included if difference between the second plurality of neuron activations with the first plurality of neuron activations exceeds the pre-defined threshold. The pre-defined threshold for activations of different neurons is different. The pre-defined threshold is statistical measure such as a multiple of standard deviation measured in the statistical profile of the first plurality of neuron activations of the training data.

In an embodiment of the present disclosure, the novelty based machine learning system with the processor includes a subset of the second plurality of neuron activations in the novelty measurements of each new sample of the new set of data samples. The subset is included if shortest distance of neurons is below the pre-defined threshold from any output of the neural network model.

In an embodiment of the present disclosure, the novelty based machine learning system with the processor measures the novelty of each new sample of the new set of data samples. The novelty is measured by statistically aggregating distance of selected neuron activations in the second plurality of neuron activations of the new sample from the statistical profile of the first plurality of neuron activations of the training data.

In a second example, a computer system is provided. The computer system includes one or more processors, and a memory. The memory is coupled to the one or more processors. The memory stores instructions. The memory is executed by the one or more processors. The execution of the memory causes the one or more processors to perform a method to improve robustness and accuracy of training of a neural network model. The computer system improves performance of the neural network model. The computer system includes a first step to receive the neural network model and a training data associated with the neural network model at a novelty based machine learning system. The computer system includes another step to examine a first plurality of neuron activations inside the neural network model for the training data at the novelty based machine learning system. The computer system includes yet another step to create a statistical profile of the first plurality of neuron activations inside the neural network model for the training data at the novelty based machine learning system. The computer system includes yet another step to receive a new set of data samples to improve the neural network model at the novelty based machine learning system. The computer system includes yet another step to examine a second plurality of neuron activations of each new sample of a new set of data samples inside the neural network model at the novelty based machine learning system. The computer system includes yet another step to measure the novelty of each new sample of the new set of data samples by comparing difference between the second plurality of neuron activations of each new sample of the new set of data samples inside the neural network model with the statistical profile of the first plurality of neuron activations inside the neural network model for the training data at the novelty based machine learning system. The computer-implemented method includes yet another step to extract one or more samples from the new set of data samples with largest novelty measurements at the novelty based machine learning system with the processor. The extracted one or more samples are labelled in case of supervised learning. The extracted one or more samples are not labeled in case of unsupervised learning. The computer-implemented method includes yet another step to add extracted samples to the existing training data for the neural network model. The addition of the extracted one or more samples is performed to re-train the neural network model. The computer-implemented method includes yet another step to re-train the neural network model using the enhanced training data and the extracted one or more samples. The performance of the neural network model improves and novelty measurement of the one or more data samples drops once the neural network model is created using the enhanced training data. The above steps are repeated until the novelty of the new set of data samples is below a pre-defined threshold. Once novelty of new samples drops, repeating the above process no longer improves the performance of the neural network model.

In an embodiment of the present disclosure, the training data is received using random sampling from a dataset. The random sampling includes simple random sampling, stratified sampling, cluster sampling, multistage sampling, and systematic random sampling. In an embodiment of the present disclosure, the training data is received in one or more formats. The one or more formats include at least one of metric data, text, images, videos, gif and animation.

In an embodiment of the present disclosure, the new set of data samples is received in one or more formats. The one or more formats include metric data, text, images, videos, gif and animation.

In an embodiment of the present disclosure, the training data is received from one or more sources. The one or more sources include at least one of an enterprise data source, IOT devices, an application, a third-party database, one or more online knowledgebase, one or more offline knowledgebase, an input device, a scanner, and a hardware computing device.

In an embodiment of the present disclosure, the novelty based machine learning system includes a subset of the second plurality of neuron activations in the novelty measurements of each new sample of the new set of data samples. The subset is included if shortest distance of neurons is below the pre-defined threshold from any output of the neural network model.

In an embodiment of the present disclosure, the novelty based machine learning system, includes a subset of the second plurality of neuron activations in the novelty measurements of each new sample of the new set of data samples. The subset is included if difference between the second plurality of neuron activations with the first plurality of neuron activations exceeds the pre-defined threshold. The pre-defined threshold for activations of different neurons is different. The pre-defined threshold is statistical measure such as a multiple of standard deviation measured in the statistical profile of the first plurality of neuron activations of the training data.

In a third example, a non-transitory computer-readable storage medium is provided. The non-transitory computer-readable storage medium encodes computer executable instructions that, when executed by at least one processor, performs a method. The method improves robustness and accuracy of training of a neural network model. The method improves performance of the neural network model. The method includes a first step to receive the neural network model and a training data associated with the neural network model at a computing device. The method includes another step to examine a first plurality of neuron activations inside the neural network model for the training data at the computing device. The method includes another step to create a statistical profile of the first plurality of neuron activations inside the neural network model for the training data at the computing device. The method includes yet another step to receive a new set of data samples to improve the neural network model at the computing device. The method includes yet another step to examine a second plurality of neuron activations of each new sample of a new set of data samples inside the neural network model at the computing device. The method includes yet another step to measure novelty of each new sample of the new set of data samples. The novelty of each new sample of the new set of data samples is measured by comparing difference between the second plurality of neuron activations of each new sample of the new set of data samples inside the neural network model with the statistical profile of the first plurality of neuron activations inside the neural network model for the training data at the computing device. The method includes yet another step to extract one or more samples from the new set of data samples with largest novelty measurements at the computing device. The extracted one or more samples are labelled in case of supervised learning. The extracted one or more samples are not labeled in case of unsupervised learning. The computer-implemented method includes yet another step to add extracted samples to the existing training data for the neural network model. The addition of the extracted one or more samples is performed to re-train the neural network model. The method includes yet another step to re-train the neural network model using the enhanced training data and the extracted one or more samples. The performance of the neural network model improves and novelty measurement of the one or more data samples drops once the neural network model is created using the enhanced training data. The above steps are repeated until the novelty of the new set of data samples is below a pre-defined threshold. Once novelty of new samples drops, the repeating the above process no longer improves the performance of neural network model.

In an embodiment of the present disclosure, the training data is received using random sampling from a dataset. The random sampling includes simple random sampling, stratified sampling, cluster sampling, multistage sampling, and systematic random sampling.

In an embodiment of the present disclosure, the training data is received in one or more formats. The one or more formats include at least one of metric data, text, images, videos, gif and animation.

In an embodiment of the present disclosure, the new set of data samples is received in one or more formats. The one or more formats include at least one of metric data, text, images, videos, gif and animation.

In an embodiment of the present disclosure, the training data is received from one or more sources. The one or more sources include at least one of an enterprise data source, IOT devices, an application, a third-party database, one or more online knowledgebase, one or more offline knowledgebase, an input device, a scanner, and a hardware computing device.

BRIEF DESCRIPTION OF THE DRAWINGS

Figure 1:
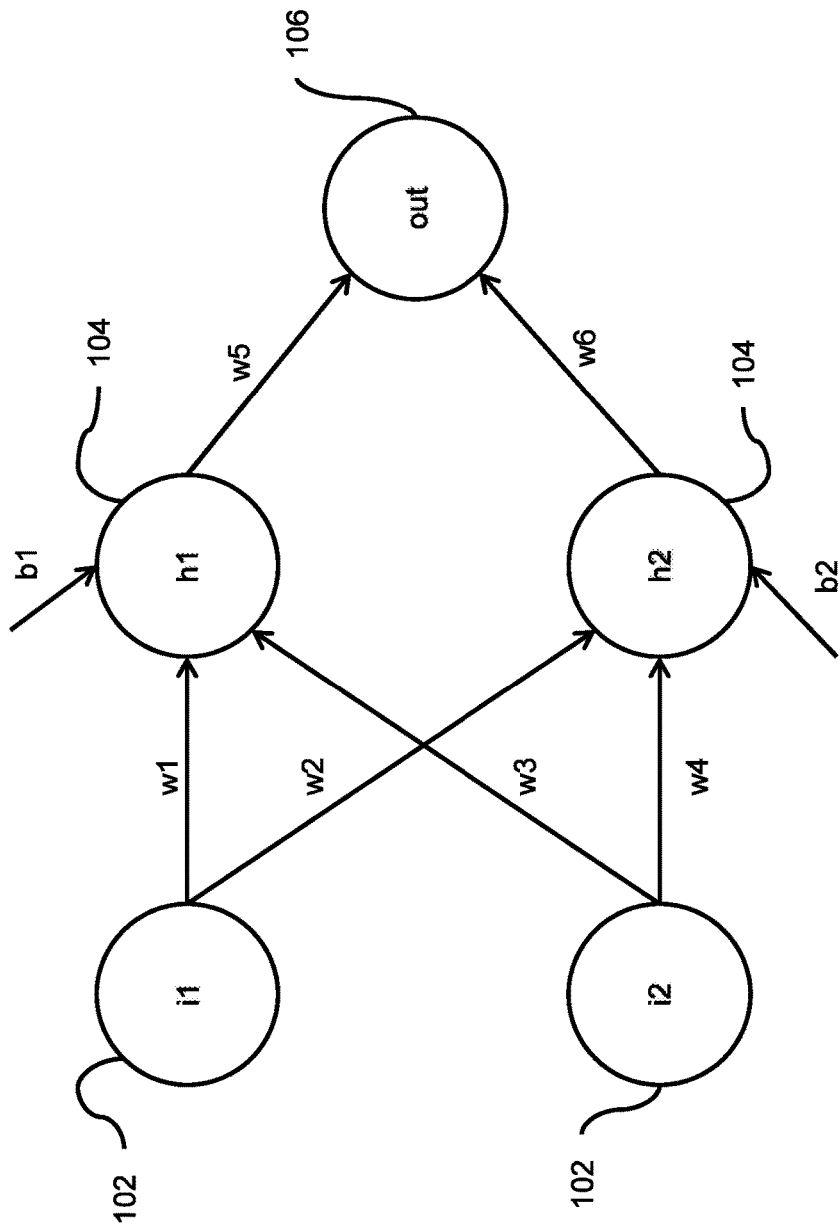
Figure 2:
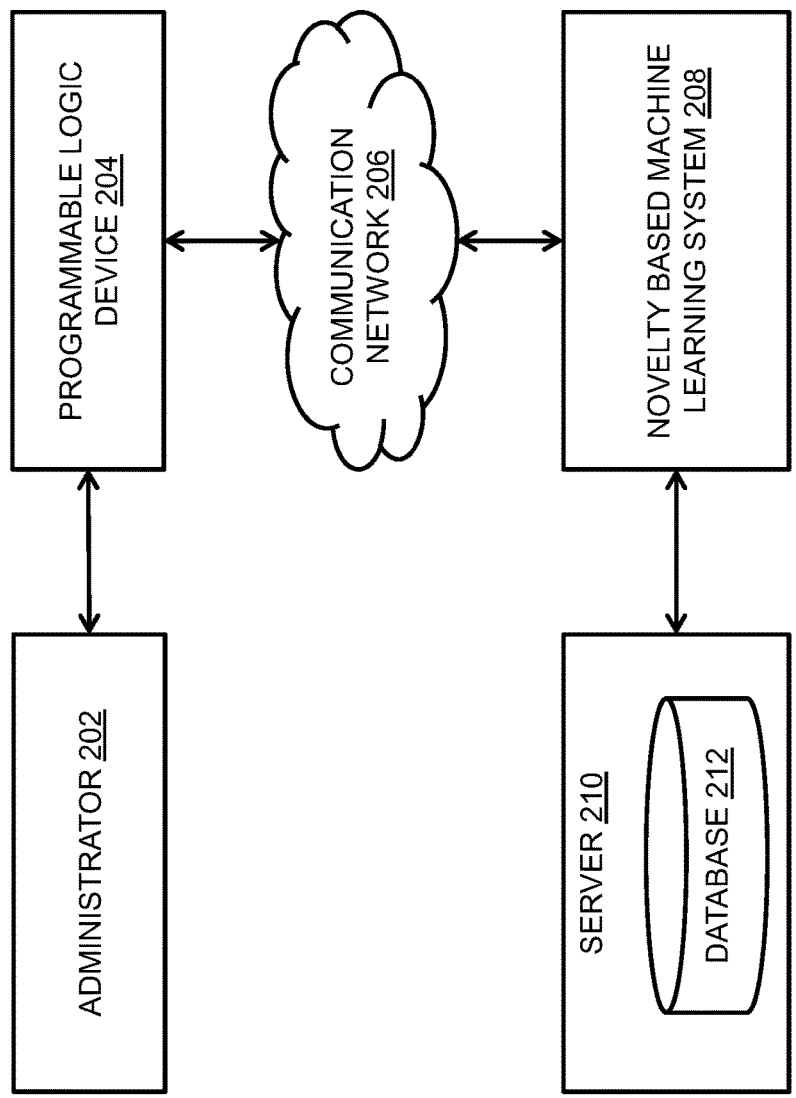
Figure 3A:
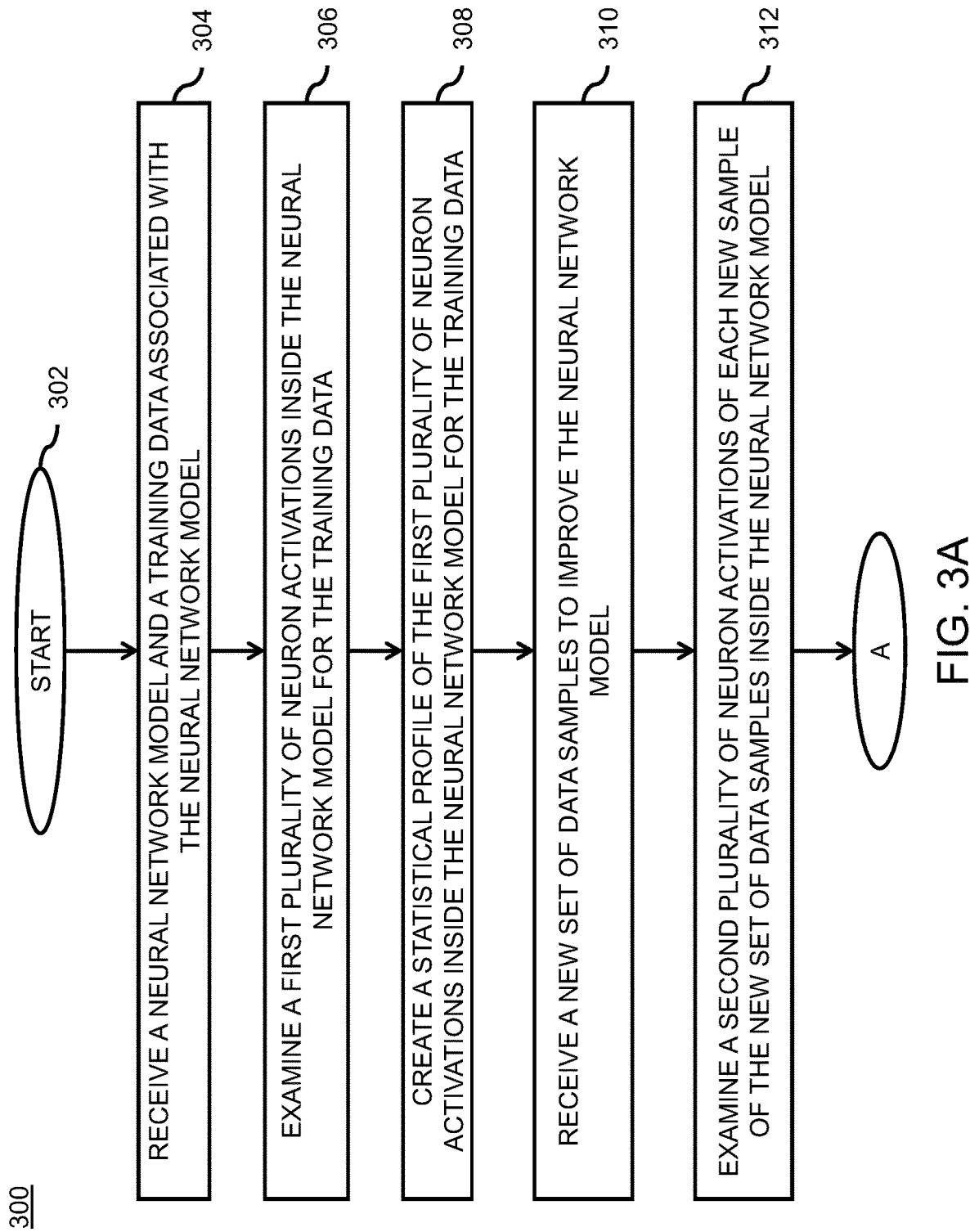
Figure 4:
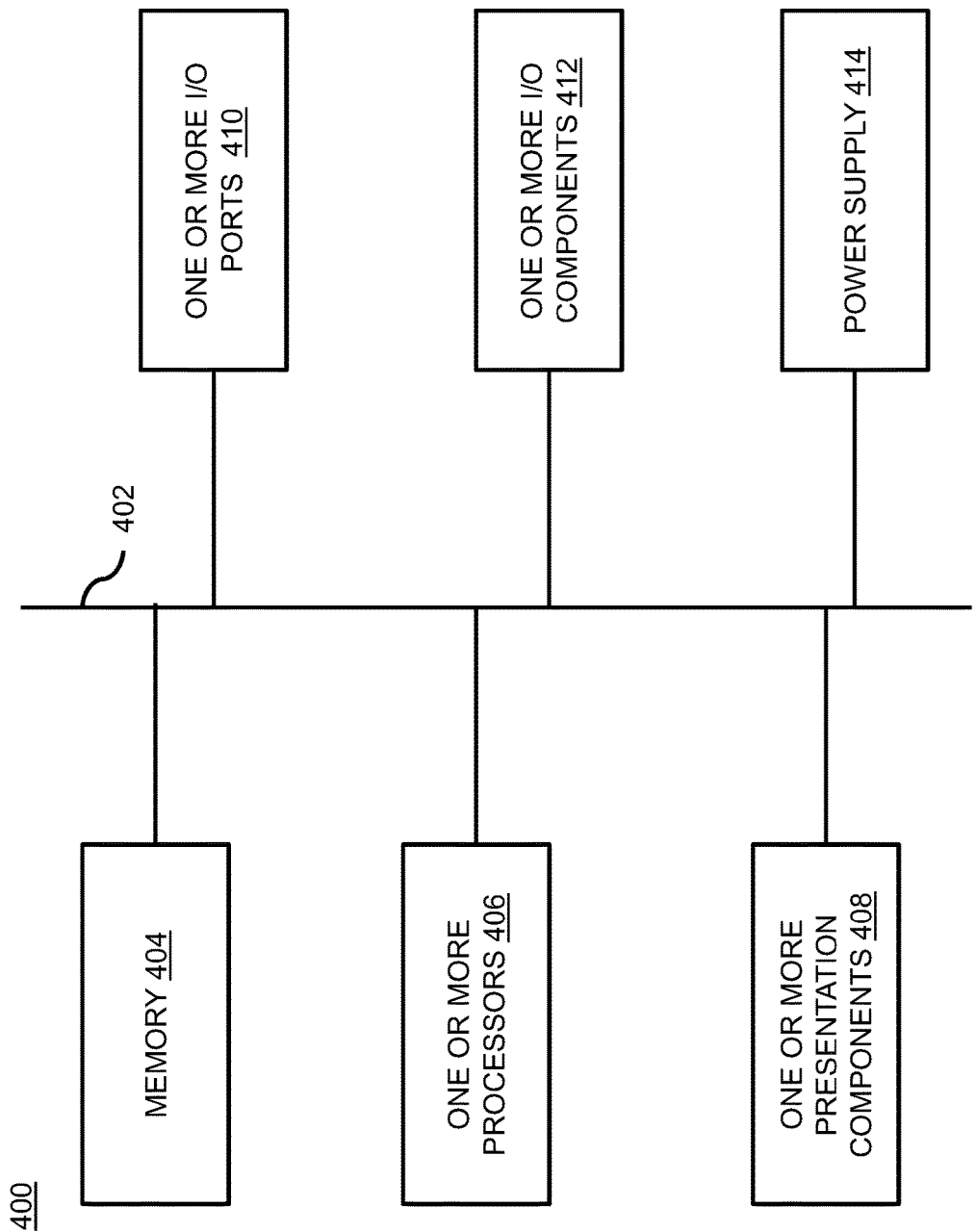

Having thus described the invention in general terms, references will now be made to the accompanying figures, wherein:

FIG. 1 illustrates an exemplary overview for a neural network, in accordance with various embodiments of the present disclosure;

FIG. 2 illustrates an interactive computing environment for improving performance of a neural network model, in accordance with various embodiments of the present disclosure;

FIGS. 3A and 3B illustrate a flow chart of a method for improving performance of the neural network model, in accordance with various embodiments of the present disclosure; and FIG. 4 illustrates a block diagram of a device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1 illustrates an exemplary overview for a neural network 100, in accordance with various embodiments of the present disclosure. The neural network 100 depicts a basic architecture of neural network model. The neural network 100 includes an input layer 102, a hidden layer 104, and an output layer 106. The input layer 102 includes a first input i1 and a second input i2. In general, input layer accepts input features. The input layer 102 provides information from outside world to the neural network 100. The input layer 102 passes information to the hidden layer 104. In general, input layer does not perform any computation.

The hidden layer 104 includes a first hidden neuron h1 and a second hidden neuron h2. In general, hidden layer performs all sort of computations on features extracted through input layer and transfer result to output layer. The first hidden neuron h1 and the second hidden neuron h2 are not exposed to outer world. The first hidden neuron h1 and the second hidden neuron h2 receive the first input i1 and the second input i2. The hidden layer 104 is connected with the output layer 106. The output layer 106 includes an output neuron out. The output layer 106 provides information learned by the neural network 100 to outer world. The neural network 100 includes a first bias b1 and a second bias b2.

In addition, a weight w1 is weight that is in connection with the first input i1 and the first hidden neuron h1. Further, a weight w2 is weight that is in connection with the first input i1 and the second hidden neuron h2. Furthermore, a weight w3 is weight that is in connection with the second input i2 and the first hidden neuron h1. Moreover, a weight w4 is weight that is in connection with the first input i1 and the second hidden neuron h2. Also, a weight w5 is weight that is in connection with the first hidden neuron h1 and the output neuron out. Also, a weight w6 is weight that is in connection with the second hidden neuron h2 and the output neuron out.

The output of the first hidden neuron h1, in the hidden layer is given by $z(1)=w1(i1)+w3(i2)+b1$. The output of the second hidden neuron h2 in the hidden layer is given by $z(2)=w2(i1)+w4(i2)+b2$. In addition, the output of the first hidden neuron h1 and the second hidden neuron h2 are independently applied with an activation function. Further, result after application of activation function is passed on to next neurons present in the neural network 100. The output of the output neuron out is calculated in a similar manner (as explained above). The output layer 106 provides final output of the neural network 100. Moreover, value of weights and value of bias is updated in real-time for each neuron in the neural network 100 until the output layer 106 provides desired output.

In general, each input is separately weighed and passed and sum is passed through an activation function. There are many different types of activation functions such as identity, rectilinear linear, tan h, softmax, and sigmoid. In general, activation function decides whether a neuron should be activated or not based on calculation of weighted sum and addition of bias with the weighted sum. Further, activation function adds non-linearity into output of neuron. In general, the output of neurons after applying activation function is referred as activation level of neurons. This invention analyzes these activation level for training data samples to create their statistical profile. It examines the activation level of neurons for new data samples, and measures the novelty of new data samples by comparing these activations with the statistical profile developed using training data samples. The neural networks illustrated in FIG. 1 has only two hidden layers; however those skilled in the art may know that, deep neural networks also known as deep learning models have many hidden layers and a very large number of neurons.

FIG. 2 illustrates an interactive computing environment 200 for improving performance of a neural network model, in accordance with various embodiments of the present disclosure. The interactive computing environment 200 includes an administrator 202, a programmable logic device 204, a communication network 206, a novelty based machine learning system 208, a server 210 and a database 212.

The interactive computing environment 200 includes the administrator 202. The administrator 202 is a person that operates and maintains the novelty based machine learning system 208. In an embodiment of the present disclosure, the administrator 202 is any person that is responsible for upkeep, configuration and reliable operation of the novelty based machine learning system 208. In yet another embodiment of the present disclosure, the administrator 202 is any person who installs, maintains and supports the novelty based machine learning system 208. In yet another embodiment of the present disclosure, the administrator 202 is any person that troubleshoots or repairs any faults in the novelty based machine learning system 208. In yet another embodiment of the present disclosure, the administrator 202 operates and maintains the novelty based machine learning system 208 through the programmable logic device 204. In yet another embodiment of the present disclosure, the administrator 202 is any person that trains the novelty based machine learning system 208. The administrator 202 is associated with the novelty based machine learning system 208.

The interactive computing environment 200 includes the programmable logic device 204. The programmable logic device 204 is associated with the administrator 202. In an embodiment of the present disclosure, the programmable logic device 204 is used by the administrator 202 to train the novelty based machine learning system 208 at back end. In another embodiment of the present disclosure, the programmable logic device 204 is used by the administrator 202 to maintain and operate the novelty based machine learning system 208. In yet another embodiment of the present disclosure, the programmable logic device 204 is used by the administrator 202 to troubleshoot the novelty based machine learning system 208.

In an embodiment of the present disclosure, the programmable logic device 204 is a portable programmable logic device. The portable programmable logic device includes but may not be limited to a laptop, smartphone, tablet, PDA and smart watch. In an example, the smartphone may be an iOS-based smartphone, an Android-based smartphone, a Windows-based smartphone and the like. In another embodiment of the present disclosure, the programmable logic device 204 is a fixed programmable logic device. The fixed programmable logic device includes but may not be limited to desktop, workstation, smart TV and mainframe computer.

In addition, the programmable logic device 204 performs computing operations based on a suitable operating system installed inside the programmable logic device 204. In general, the operating system is system software that manages computer hardware and software resources and provide common services for computer programs. In addition, the operating system acts as an interface for software installed inside the programmable logic device 204 to interact with hardware components of the programmable logic device 204. In an embodiment of the present disclosure, the programmable logic device 204 performs computing operations based on any suitable operating system designed for the portable programmable logic device. In an example, the operating system installed inside the programmable logic device 204 is a mobile operating system. Further, the mobile operating system includes but may not be limited to Windows operating system from Microsoft, Android operating system from Google, iOS operating system from Apple, Symbian operating system from Nokia, Bada operating system from Samsung Electronics and BlackBerry operating system from BlackBerry, Sailfish from Jolla. However, the operating system is not limited to above mentioned operating systems. In an embodiment of the present disclosure, the programmable logic device 204 operates on any version of particular operating system corresponding to above mentioned operating systems.

In another embodiment of the present disclosure, the programmable logic device 204 performs computing operations based on any suitable operating system designed for fixed programmable logic device. In an example, the operating system installed inside the programmable logic device 204 is Windows from Microsoft. In another example, the operating system installed inside the programmable logic device 204 is Mac from Apple. In yet another example, the operating system installed inside the programmable logic device 204 is Linux based operating system. In yet another example, the operating system installed inside the programmable logic device 204 is Chrome OS from Google. In yet another example, the operating system installed inside the programmable logic device 204 may be one of UNIX, Kali Linux, and the like. However, the operating system is not limited to above mentioned operating systems.

In an embodiment of the present disclosure, the programmable logic device 204 operates on any version of Windows operating system. In another embodiment of the present disclosure, the programmable logic device 204 operates on any version of Mac operating system. In yet another embodiment of the present disclosure, the programmable logic device 204 operates on any version of Linux operating system. In yet another embodiment of the present disclosure, the programmable logic device 204 operates on any version of Chrome OS. In yet another embodiment of the present disclosure, the programmable logic device 204 operates on any version of particular operating system corresponding to above mentioned operating systems.

Further, the interactive computing environment 200 includes the communication network 206. In an embodiment of the present disclosure, the communication network 206 connects the programmable logic device 204 to the novelty based machine learning system 208. The programmable logic device 204 is connected to the novelty based machine learning system 208 through the communication network 206. The communication network 206 provides medium to the programmable logic device 204 to connect to the novelty based machine learning system 208. Also, the communication network 206 provides network connectivity to the programmable logic device 204. Moreover, the communication network 206 provides access to a training data and a new set of data samples to the novelty based machine learning system 208. In an example, the communication network 206 uses a set of protocols to connect the programmable logic device 204 to the novelty based machine learning system 208. The communication network 206 connects the programmable logic device 204 to the novelty based machine learning system 208 using a plurality of methods. The plurality of methods used to provide network connectivity to the programmable logic device 204 includes 2G, 3G, 4G, 5G, Wifi and the like.

In an embodiment of the present disclosure, the communication network 206 is any type of network that provides internet connectivity to the programmable logic device 204. In an embodiment of the present disclosure, the communication network 206 is wireless mobile network. In another embodiment of the present disclosure, the communication network 206 is wired network with finite bandwidth. In yet another embodiment of the present disclosure, the communication network 206 is combination of the wireless and the wired network for optimum throughput of data transmission. In yet another embodiment of the present disclosure, the communication network 206 is an optical fiber high bandwidth network that enables high data rate with negligible connection drops.

The interactive computing environment 200 includes the novelty based machine learning system 208. In an embodiment of the present disclosure, the novelty based machine learning system 208 runs on the programmable logic device 204. In another embodiment of the present disclosure, the novelty based machine learning system 208 is installed on the programmable logic device 204. In yet another embodiment of the present disclosure, the novelty based machine learning system 208 is programmed on the programmable logic device 204. In yet another embodiment of the present disclosure, the administrator 202 operates the novelty based machine learning system 208 through the programmable logic device 204. In yet another embodiment of the present disclosure, the novelty based machine learning system 208 is installed at the server 210. In yet another embodiment of the present disclosure, the novelty based machine learning system 208 is installed at a plurality of servers. In an embodiment of the present disclosure, the plurality of servers communicates with each other using the communication network 206. In an example, the plurality of servers may include one of database server, file server, network server, application server and the like.

In an embodiment of the present disclosure, the programmable logic device 204 connects to the novelty based machine learning system 208 by utilizing one or more applications. In general, the application is any software code that is programmed to interact with hardware elements of the programmable logic device 204. The term hardware elements include but may not be limited to a plurality of memory types installed inside the programmable logic device 204. Moreover, the application is used to access, read, update and modify data stored in the hardware elements of the programmable logic device 204. Further, the application provides a user interface to the administrator 202 to interact with the hardware elements of the programmable logic device 204. In an example, the user interface may include Graphical User Interface (GUI), command line interface and the like. The user interface helps to send and receive user commands and data. In addition, the user interface serves to display or return results of operation from the application. In an embodiment of the present disclosure, the user interface is part of the application. In an embodiment of the present disclosure, the mobile application installed inside the programmable logic device 204 may be based on any mobile platform.

In another embodiment of the present disclosure, the programmable logic device 204 accesses the novelty based machine learning system 208 using a web-based interface. In yet another embodiment of the present disclosure, the novelty based machine learning system 208 is accessed through a web browser installed inside the programmable logic device 204. In an example, the web-browser includes but may not be limited to Opera, Mozilla Firefox, Google Chrome, Internet Explorer, Microsoft Edge, Safari and UC Browser. Further, the web browser installed on the programmable logic device 204 runs on any version of the respective web browser of the above mentioned web browsers.

In an embodiment of the present disclosure, the administrator 202 uses the programmable logic device 204 to operate the novelty based machine learning system 208. The novelty based machine learning system 208 improves data for training of the neural network model. In an embodiment of the present disclosure, the neural network model may be one of sparse neural network model, deep neural network model and the like. In an embodiment of the present disclosure, the novelty based machine learning system 208 improves data for training of the neural network for maintenance of the neural network model. In another embodiment of the present disclosure, the novelty based machine learning system 208 improves data for training of the neural network for development of the neural network model. In an embodiment of the present disclosure, the novelty based machine learning system 208 utilizes data to train and iteratively re-train the neural network model using most relevant data to improve accuracy and performance of the neural network model. The novelty based machine learning system 208 detects novelty in data. In an embodiment of the present disclosure, the neural network model may be based on a domain of interest of the administrator 202. In an embodiment of the present disclosure, the domain of interest includes but may not be limited to medical domain, financial domain, and educational domain.

In an example, the neural network model is based on medical domain. The neural network model is trained with data related to medical history, medical records, medical reports, medical transactions, medicine details, test reports and the like. In another example, the neural network model is based on financial domain. The neural network model is trained with data related to financial transactions, accounting, financial reports, budgeting and the like. In yet another example, the neural network model is based on educational domain. The neural network model is trained with data related to educational reports, educational information, educational tests, educational definitions and the like. In yet another example, the neural network model is based on domain such as communication, security, marketing, telecommunication, and the like.

The novelty based machine learning system 208 receives the neural network model and the training data associated with the neural network model. The novelty based machine learning system 208 extracts the training data for the neural network model. The training data is received using random sampling from a dataset. The training data is received from one or more sources using random sampling. The one or more sources include at least one of an enterprise data source, IOT devices, an application, a third-party database, one or more online knowledgebase, one or more offline knowledgebase, an input device, a scanner, and a hardware computing device. In an embodiment of the present disclosure, the third-party databases are databases that do not have any direct connection with the novelty based machine learning system 208. The random sampling includes but may not be limited to simple random sampling, stratified sampling, cluster sampling, multistage sampling, and systematic random sampling. The training data is extracted to initially train the neural network model. In an embodiment of the present disclosure, the training data is received in one or more formats. The one or more formats include metric data, text, images, videos, gif, animation and the like. In general, online knowledgebase is a body of questions, answers, documentations, tips and tricks, best practices, knowledge and the like that an enterprise creates, collects and stores online over time. In an example, the one or more online knowledgebase includes but may not be limited to Wikipedia, DBpedia, Canva, Yoast, and Lyft. In general, offline knowledgebase is a body of questions, answers, documentations, tips and tricks, best practices, knowledge and the like that an enterprise creates, collects and stores offline over time. In an example, the one or more offline knowledgebase includes but may not be limited to an encyclopedia. In an example, the one or more sources include an input device. In another example, the one or more sources include a scanner. In yet another example, the input device includes a light pen, a bar code reader (BCR), and the like.

In an example, the training data includes data from IOT sensors, telemetry data, medical sensor images, camera images, web logs, system log files, RFID tags, social networks, online websites, blogs, call logs and the like. In another example, the training data includes but may not be limited to application data, sensor data, customer data, user feedback data, call records, SMS records and Internet search indexing data. In yet another example, the training data includes complex data such as military surveillance data, astronomic data, biogeochemical data, genomic data, atmospheric science data, research data and the like.

In general, the neural network model includes a plurality of layers. In addition, each layer of the plurality of layers includes a plurality of neurons that implement a transformation function. Further, earlier layers of the plurality of layers extract low level features from an input data. In general, the neural network layers extract high level features as we move deeper in the neural network. In an example, if input data includes images, earlier layer may detect edges, corners, and other lower level features in an image, and while the deeper layer recognizes the faces, objects and the like. In general, building statistical profile of neuron activations inside neural network of depth N is required for the detection of data with novelty or data that creates confusion for the neural network model. Moreover, weight assigned to the neuron activations in novelty measurement depends on their distance from the output. As the distance drops, the weight increases. However, for neural network models of type auto-encoder, which model the input itself, the distance is measured from the encoding layer.

The novelty based machine learning system 208 examines a first plurality of neuron activations inside the neural network model for data samples in the training data. The novelty based machine learning system 208 creates a statistical profile of the first plurality of neuron activations. In general, neural network is a system of hardware and/or software patterned after the operation of neurons in the human brain. In addition, neural network is a network or circuit of artificial neurons. In general, an artificial neuron is a mathematical function conceived as a model of biological neurons, a neural network. Also, connections of a neuron are modelled as weights. Further, a positive weight reflects an excitatory connection and a negative weight reflects an inhibitory connection. Furthermore, all inputs are modified by weight and summed together. Moreover, an activation function controls amplitude of output. In general, activation function of a node defines output of that node given an input or a set of inputs.

The novelty based machine learning system 208 receives a new set of data samples to improve the neural network model. In an embodiment of the present disclosure, the new set of data samples is unlabeled. In addition, the new set of data samples are used as input data for the neural network model. In an embodiment of the present disclosure, the new set of data samples are received in one or more formats. The one or more formats include metric data, text, images, videos, gif, animation and the like.

The novelty based machine learning system 208 examines a second plurality of neuron activations for each new sample of the new set of data samples inside the neural network model. The examination is performed for measuring novelty of each new sample of the new set of data samples.

The novelty based machine learning system 208 measures the novelty of each new sample of the new set of data samples. The measurement is performed by comparing the second plurality of neuron activations of each new sample of the new set of data samples inside the neural network model with the statistical profile of the first plurality of neuron activations inside the neural network model for the training data.

The novelty based machine learning system 208 extracts one or more samples from the new set of data samples with largest novelty measurements. The novelty measurement is a unit of measurement of novelty of the one or more samples in the new set of data samples. The extracted one or more samples are labelled in case of supervised learning. The extracted one or more samples are not labelled in case of unsupervised learning. In an embodiment of the present disclosure, the extracted one or more samples are added to the training data and the neural network is retrained using enhanced training data.

Further, the examination of the first plurality of neuron activations inside the neural network model is performed to create the statistical profile of the neural network model. Further, the output of a selected neuron from the second plurality of neurons for a new data sample (that is referred to as the neuron activation level) is examined and its statistical distance from the statistical profile of that neuron is computed. Accordingly, the distance of all selected neurons from the second plurality of neurons for the new sample is aggregated using standard statistical methods and transformed into a novelty metric (novelty measurement) for the new data sample. Also, the novelty based machine learning system 208 measures the novelty measurement of each new sample of the new set of data samples.

The novelty metric is used to decide which new samples must be added to the training data. The one or more samples with the high novelty measurement are added to the existing training data to re-train neural network model in the novelty based machine learning system 208.

The novelty based machine learning system 208 adds the extracted one or more samples with the largest novelty measurements to the training data of the neural network model. The one or more samples are extracted and added to the training data if and only if the one or more samples contain the largest novelty measurement which exceeds pre-defined threshold. The extracted one or more samples are labeled before adding them to the training data in case of supervised learning. In addition, there is no requirement for labelling in case of unsupervised learning. Moreover, the addition of the extracted one or more samples to the existing training data is performed to improve the performance and robustness of the neural network model in the real-world use. The novelty based machine learning system 208 re-trains the neural network model with enhanced training data. In addition, the above process is repeated until the novelty of the one or more samples of the new set of data samples is below a pre-defined threshold.

In an embodiment of the present disclosure, the novelty measurements are performed for new set of data. In an embodiment of the present disclosure, these novelty measurements are done offline. In another embodiment of the present disclosure, these novelty measurements are done in real-time while the neural network model is being used in its application and making inference. In general, inference is where capabilities learned during deep learning training are put to work In addition, inference cannot happen without training. In an embodiment of the present disclosure, the process of model inferences and novelty measurement may be combined and both may be carried out together. Further, the one or more samples are extracted and labeled based on the novelty measurement if the neural network model is based on supervised learning. Furthermore, the one or more samples are added to the training data. The neural network model in the novelty based machine learning system 208 is retrained using enhanced training data. In an example, the new set of data samples includes data more reliable than previous data used to train the neural network model.

In an embodiment of the present disclosure, the new set of data samples include data from IOT sensors, telemetry data, medical sensor images, camera images, web logs, system log files, RFID tags, social networks, online websites, blogs, call logs and the like. In another embodiment of the present disclosure, the new set of data samples includes complex data such as military surveillance data, astronomic data, biogeochemical data, genomic data, atmospheric science data, research data and the like.

As the novelty metric based data filtering is repeated, the neural network model should be re-trained by combining the training data with the new set of data samples with the highest novelty metric found in the last iteration. In addition, only the retrained model is used to find the additional batch of new samples with the highest novelty metric. Further, the iterative process ensures that the next batch of the extracted data samples only contains the incremental novelty that is still missing in the training data Further, the retrained neural network model is used to create statistical profile of neuron activations for enhanced training data that contain original training data and new samples that were extracted using novelty metric. The neuron activations map input data in the feature space, and their statistical profile extracts probability distributions for these features. The one or more samples whose neuron activations have low probabilities are data samples, which the neural network model finds confusing and often makes mistakes in prediction. The novelty metric for such data samples is high. Therefore, the novelty based machine learning system 208 improves performance by finding out one or more samples whose aggregated neuron activations have low probability. In addition, pre-defined threshold for the low probability can be adjusted depending on the application. The one or more samples are used to re-train the neural network model and make it more accurate and robust. Moreover, the statistical profile of neuron activations is redeveloped after retraining the neural network model with enhanced training data.

In an embodiment of the present disclosure, the activation statistical profile created after the model training is used to analyze the data in real world use. In an example, if a given sample has a very high probability of being different based on the statistical profile determined previously, its novelty metric will be high and it will be marked as a candidate to be added to the training data. The addition of the one or more samples with high novelty metric into the training data improves performance of the neural network model in real world use.

In an embodiment of the present disclosure, the novelty metric based statistical profile includes a plurality of statistical measures for neuron activation levels. The plurality of statistical measures includes but may not be limited to averages, standard deviations, correlations, and probability distributions. In general, average is single value (such as a mean, mode, or median) that summarizes or represents the general significance of a set of unequal values. In general, standard deviation is a quantity expressing by how much the members of a group differ from the mean value for the group, in an embodiment of the present disclosure, the novelty measurement of a new sample from the set of new data samples is performed by aggregating the statistical distance of the selected neuron activations from their statistical profile using plurality of techniques such as Euclidean distance, Mahanlanobis distance, and the like.

In an embodiment of the present disclosure, the one or more samples, whose novelty metric is high, are usually a very small percentage of all the one or more samples seen in real world use. The majority of the one or more samples that are recognized by the novelty metric based statistical profiler have low novelty metric and considered as normal data with no novel information. In an embodiment of the present disclosure, if the neural network model is developed using supervised learning, the samples extracted with high novelty metric are labeled before they are added into the training data. In another embodiment of the present disclosure, if the neural network was developed using unsupervised learning, no additional labeling is required before adding the samples in the training data. This process is repeated iteratively until the novelty metric threshold of all available data is below the pre-defined threshold. Moreover, above stated procedure is used to maintain performance and robustness of the neural network model once it goes live in production. In addition, performance of the neural network model drifts lower over time because the statistical properties of real world use data changes with time. The novelty based machine learning system 208 extracts new batches of the dataset periodically with the highest novelty metric and add them to training dataset and retrain the neural network model. This method stops the neural network model from drifting.

Once, the neural network model is re-trained with the enhanced training data, the performance of the neural network model improves and the novelty measurement of the new set of data samples drop as the neural network is re-trained with the new set of data samples. This process is repeated until the novelty measurement of the new set of data samples is below the pre-defined threshold. Once novelty of new samples drops, repeating the above process no longer improves the performance of neural network model. The method outlined above leads to significant improvement in performance and robustness of the neural network model in real world use.

In an embodiment of the present disclosure, the novelty based machine learning system 208 includes a subset of the second plurality of neuron activations in the novelty measurements of each new sample of the new set of data samples. The novelty based machine learning system 208 includes the subset only if difference between the second plurality of neuron activations with the first plurality of neuron activations exceeds the pre-defined threshold. The pre-defined threshold for activations of different neurons is different. The pre-defined threshold is statistical measure such as a multiple of standard deviation measured in the statistical profile of the first plurality of neuron activations of the training data.

In an embodiment of the present disclosure, the novelty based machine learning system 208 includes a subset of the second plurality of neuron activations in the novelty measurements of each new sample of the new set of data samples. The subset is included only if shortest distance of neurons is below the pre-defined threshold from any output of the neural network model.

In an embodiment of the present disclosure, the novelty based machine learning system 208 measures the novelty of each new sample of the new set of data samples. The novelty is measured by statistically aggregating distance of neuron activations in the second plurality of neuron activations of the new sample from the statistical profile of the first plurality of neuron activations of the training data.

The interactive computing environment 200 includes the server 210. Further, the novelty based machine learning system 208 is associated with the server 210. In an embodiment of the present disclosure, the novelty based machine learning system 208 runs on the server 210. In another embodiment of the present disclosure, the novelty based machine learning system 208 is installed on the server 210. In general, server is a computer program that provides service to another computer programs. In general, server may provide various functionalities or services, such as sharing data or resources among multiple clients, performing computation for a client and the like. In an example, the server 210 may be one of at least dedicated server, cloud server, virtual private server and the like. However, the server 210 is not limited to above mentioned servers.

The interactive computing environment 200 includes the database 212. Furthermore, the database 212 is associated with the server 210. In general, the database 212 is a collection of information that is organized so that it can be easily accessed, managed and updated. The database 212 provides storage location to the training data, the new set of data samples and the like. In an embodiment of the present disclosure, the database 212 provides storage location to all the data and information required by the novelty based machine learning system 208. In an embodiment of the present disclosure, the database 212 may be one of at least hierarchical database, network database, relational database, object-oriented database and the like. However, the database 212 is not limited to the above mentioned databases. In an example, the database 212 is connected with the server 210. The server 210 stores the training data and the new set of data samples in the database 212. The server 210 interacts with the database 212 to retrieve the stored data.

In an embodiment of the present disclosure, the novelty based machine learning system 208 extracts the training data and the new set of data samples from the one or more sources using one or more hardware-run information extraction algorithms. In general, Information extraction (hereinafter, IE) is the task of automatically extracting structured information from unstructured and/or semi-structured machine-readable documents. In an example, the novelty based machine learning system 208 extracts the training data and the new set of data samples from the one or more sources using named entity recognition (hereinafter, NER) algorithms. In general, NER is a subtask of IE that seeks to locate and classify named entities in text into pre-defined categories such as names of persons, organizations, locations, expressions of times, quantities, monetary values, percentages, and the like. In another example, the novelty based machine learning system 208 extracts the training data and the new set of data samples from the one or more sources using SVM algorithms. In yet another example, the novelty based machine learning system 208 extracts the training data and the new set of data samples from the one or more sources using clustering algorithms.

In an embodiment of the present disclosure, the new set of data samples is in one or more languages. In an example, the new set of data samples is in English language. In another example, the new set of data samples is in Hindi language. In yet another example, the new set of data samples is in German language. In yet another example, the new set of data samples is in Spanish language. In yet another example, the new set of data samples is in French language.

FIGS. 3A and 3B illustrate a flow chart 300 for the method for improving performance of the neural network model, in accordance with various embodiments of the present disclosure. It may be noted that to explain the process steps of flowchart 300, references will be made to the system elements of FIG. 2. It may also be noted that the flowchart 300 may have lesser or more number of steps.

The flowchart 300 initiates at step 302. Following step 302, at step 304, the novelty based machine learning system 208 receives the neural network model and the training data associated with the neural network model. At step 306, the novelty based machine learning system 208 examines the first plurality of neuron activations inside the neural network model for the training data. At step 308, the novelty based machine learning system 208 creates the statistical profile of the first plurality of neuron activations inside the neural network model for the training data. At step 310, the novelty based machine learning system 208 receives the new set of data samples to improve the neural network model. At step 312, the novelty based machine learning system 208 examines the second plurality of neuron activations of each new sample of the new set of data samples inside the neural network model. At step 314, the novelty based machine learning system 208 measures the novelty of each new sample of the new set of data samples by comparing difference between the second plurality of neuron activations of each new sample of the new set of data samples inside the neural network model with the statistical profile of the first plurality of neuron activations inside the neural network model for the training data. At step 316, the novelty based machine learning system 208 extracts the one or more samples from the new set of data samples with largest novelty measurements. At step 318, the novelty based machine learning system 208 adds the extracted one or more samples with the largest novelty measurements to the training data of the neural network model. At step 320, the novelty based machine learning system 208 repeats above steps until the novelty of the new set of data samples is below the pre-defined threshold. The flow chart 300 terminates at step 322.

The novelty based machine learning system 208 may be implemented using a single programmable logic device, or a network of programmable logic devices, including cloud-based computer implementations. The programmable logic devices are preferably server class computers including one or more high-performance computer processors and random access memory, and running an operating system such as LINUX or variants thereof. The operations of the novelty based machine learning system 208 as described herein can be controlled through either hardware or through computer programs installed in non-transitory computer readable storage devices such as solid state drives or magnetic storage devices and executed by the processors to perform the functions described herein. The database 212 is implemented using non-transitory computer readable storage devices, and suitable database management systems for data access and retrieval. The novelty based machine learning system 208 includes other hardware elements necessary for the operations described herein, including network interfaces and protocols, input devices for data entry, and output devices for display, printing, or other presentations of data. Additionally, the operations listed here are necessarily performed at such a frequency and over such a large set of data that they must be performed by a computer in order to be performed in a commercially useful amount of time, and thus cannot be performed in any useful embodiment by mental steps in the human mind.

FIG. 4 illustrates a block diagram of the device 400, in accordance with various embodiments of the present disclosure. In an embodiment of the present disclosure, FIG. 4 illustrates internal structural overview of the programmable logic device 204. The device 400 includes a bus 402 that directly or indirectly couples the following devices: memory 404, one or more processors 406, one or more presentation components 408, one or more input/output (I/O) ports 410, one or more input/output components 412, and an illustrative power supply 414. The bus 402 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary device 400 that can be used in connection with one or more embodiments of the present invention. Distinction is not made between such categories as "workstation," "server," "laptop," "hand-held device," etc., as all are contemplated within the scope of FIG. 4 and reference to "computing device".

The device 400 typically includes a variety of computer-readable media. The computer-readable media can be any available media that can be accessed by the device 400 and includes both volatile and nonvolatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, non-transitory computer-readable storage medium that stores program code and/or data for short periods of time such as register memory, processor cache and random access memory (RAM), or any other medium which can be used to store the desired information and which can be accessed by the device 400. The computer storage media includes, but is not limited to, non-transitory computer readable storage medium that stores program code and/or data for longer periods of time, such as secondary or persistent long term storage, like read only memory (ROM), EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the device 400. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. The memory 404 may be removable, non-removable, or a combination thereof. Exemplary hardware devices include solid-state memory, hard drives, optical-disc drives, etc. The device 400 includes the one or more processors 406 that read data from various entities such as memory 404 or I/O components 412. The one or more presentation components 408 present data indications to a user or other device. Exemplary presentation components include a display device, speaker, printing component, vibrating component, etc. The one or more I/O ports 410 allow the device 400 to be logically coupled to other devices including the one or more I/O components 412, some of which may be built in. Illustrative components include a microphone, joystick, game pad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:

1. A computer-implemented method for improving performance of a neural network model, the computer-implemented method comprising:
    receiving, at a novelty based machine learning system with a processor, the neural network model and a training data associated with the neural network model;
    examining, at the novelty based machine learning system with the processor, a first plurality of neuron activations inside the neural network model for the training data;
    creating, at the novelty based machine learning system with the processor, a statistical profile of the first plurality of neuron activations inside the neural network model for the training data;
    receiving, at the novelty based machine learning system with the processor, a new set of data samples to improve the neural network model;
    examining, at the novelty based machine learning system with the processor, a second plurality of neuron activations of each new sample of the new set of data samples inside the neural network model;
    measuring, at the novelty based machine learning system with the processor, novelty of each new sample of the new set of data samples by comparing difference between the second plurality of neuron activations of each new sample of the new set of data samples inside the neural network model with the statistical profile of the first plurality of neuron activations inside the neural network model for the training data;
    extracting, at the novelty based machine learning system with the processor, one or more samples from the new set of data samples with largest novelty measurements; wherein the extracted one or more samples are labelled in case of supervised learning, wherein the extracted one or more samples are not labelled in case of unsupervised learning;
    adding, at the novelty based machine learning system with the processor, the extracted one or more samples with the largest novelty measurements to the training data of the neural network model, wherein the addition of the extracted one or more samples is performed for re-training the neural network model; and
    repeating, at the novelty based machine learning system with the processor, above steps until the novelty of the new set of data samples is below a pre-defined threshold, wherein these iterations are performed for improving performance of the neural network model.

2. The computer-implemented method as recited in claim 1, wherein the training data is received in one or more formats, wherein the one or more formats comprising at least one of metric data, text, images, videos, gif and animation.

3. The computer-implemented method as recited in claim 1, wherein the new set of data samples is received in one or more formats, wherein the one or more formats comprising at least one of metric data, text, images, videos, gif and animation.

4. The computer-implemented method as recited in claim 1, wherein the training data is received from one or more sources, wherein the one or more sources comprising at least one of an enterprise data source, IOT devices, an application, a third-party database, one or more online knowledgebase, one or more offline knowledgebase, an input device, a scanner, and a hardware computing device.

5. The computer-implemented method as recited in claim 1, wherein the training data is received using random sampling from a dataset, wherein the random sampling comprising simple random sampling, stratified sampling, cluster sampling, multistage sampling, and systematic random sampling.

6. The computer-implemented method as recited in claim 1, further comprising including, at the novelty based machine learning system with the processor, a subset of the second plurality of neuron activations in the novelty measurements of each new sample of the new set of data samples, wherein the subset is included if difference between the second plurality of neuron activations with the first plurality of neuron activations exceeds the pre-defined threshold, wherein the pre-defined threshold for activations of different neurons are different, wherein the pre-defined threshold is a statistical measure such as a multiple of standard deviation measured in the statistical profile of the first plurality of neuron activations of the training data.

7. The computer-implemented method as recited in claim 1, further comprising including, at the novelty based machine learning system with the processor, a subset of the second plurality of neuron activations in the novelty measurements of each new sample of the new set of data samples, wherein the subset is included if shortest distance of neurons from any output of the neural network model is below a pre-defined threshold.

8. The computer-implemented method as recited in claim 1, further comprising measuring, at the novelty based machine learning system with the processor, the novelty of each new sample of the new set of data samples, wherein the novelty is measured by statistically aggregating distance of each neuron activation in the second plurality of neuron activations of the new sample from the statistical profile of the first plurality of neuron activations of the training data.

9. A computer system comprising:
one or more processors; and
a memory coupled to the one or more processors, the memory for storing instructions which, when executed by the one or more processors, cause the one or more processors to perform a method for improving performance of a neural network model, the method comprising:
receiving, at a novelty based machine learning system, the neural network model and a training data associated with the neural network model;
examining, at the novelty based machine learning system, a first plurality of neuron activations inside the neural network model for the training data;
creating, at the novelty based machine learning system, a statistical profile of the first plurality of neuron activations inside the neural network model for the training data;
receiving, at the novelty based machine learning system, a new set of data samples to improve the neural network model;
examining, at the novelty based machine learning system, a second plurality of neuron activations of each new sample of the new set of data samples inside the neural network model;
measuring, at the novelty based machine learning system, novelty of each new sample of the new set of data samples by comparing difference between the second plurality of neuron activations of each new sample of the new set of data samples inside the neural network model with the statistical profile of the first plurality of neuron activations inside the neural network model for the training data;
extracting, at the novelty based machine learning system, one or more samples from the new set of data samples with largest novelty measurements, wherein the extracted one or more samples are labelled in case of supervised learning, wherein the extracted one or more samples are unlabeled in case of unsupervised learning;
adding, at the novelty based machine learning system, the extracted one or more samples with the largest novelty measurements to the training data of the neural network model, wherein the addition of the extracted one or more samples is performed for re-training the neural network model; and
repeating, at the novelty based machine learning system, above steps until the novelty of the new set of data samples is below a pre-defined threshold, wherein these iterations are performed for improving performance of the neural network model.

10. The computer system as recited in claim 9, wherein the training data is received using random sampling from a dataset, wherein the random sampling comprising simple random sampling, stratified sampling, cluster sampling, multistage sampling, and systematic random sampling.

11. The computer system as recited in claim 9, wherein the training data is received in one or more formats, wherein the one or more formats comprising at least one of metric data, text, images, videos, gif and animation.

12. The computer system as recited in claim 9, wherein the new set of data samples is received in one or more formats, wherein the one or more formats comprising metric data, text, images, videos, gif and animation.

13. The computer system as recited in claim 9, wherein the training data is received from one or more sources, wherein the one or more sources comprising at least one of an enterprise data source, IOT devices, an application, a third-party database, one or more online knowledgebase, one or more offline knowledgebase, an input device, a scanner, and a hardware computing device.

14. The computer system as recited in claim 9, further comprising including, at the novelty based machine learning system, a subset of the second plurality of neuron activations in the novelty measurements of each new sample of the new set of data samples, wherein the subset is included if shortest distance of neurons is below the pre-defined threshold from any output of the neural network model.

15. The computer system as recited in claim 9, further comprising including, at the novelty based machine learning system, a subset of the second plurality of neuron activations in the novelty measurements of each new sample of the new set of data samples, wherein the subset is included if difference between the second plurality of neuron activations with the first plurality of neuron activations exceeds the pre-defined threshold, wherein the pre-defined threshold for activations of different neurons are different, wherein the pre-defined threshold is statistical measure such as a multiple of standard deviation measured in the statistical profile of the first plurality of neuron activations of the training data.

16. A non-transitory computer-readable storage medium encoding computer executable instructions that, when executed by at least one processor, performs a method for improving performance of a neural network model, the method comprising:
receiving, at a computing device, the neural network model and a training data associated with the neural network model;
examining, at the computing device, a first plurality of neuron activations inside the neural network model for the training data;
creating, at the computing device, a statistical profile of the first plurality of neuron activations inside the neural network model for the training data;
receiving, at the computing device, a new set of data samples to improve the neural network model;
examining, at the computing device, a second plurality of neuron activations of each new sample of the new set of data samples inside the neural network model;
measuring, at the computing device, novelty of each new sample of the new set of data samples by comparing difference between the second plurality of neuron activations of each new sample of the new set of data samples inside the neural network model with the statistical profile of the first plurality of neuron activations inside the neural network model for the training data;

extracting, at the computing device, one or more samples from the new set of data samples with largest novelty measurements, wherein the extracted one or more samples are labelled in case of supervised learning, wherein the extracted one or more samples are unlabeled in case of unsupervised learning;

adding, at the computing device, the extracted one or more samples with the largest novelty measurements to the training data of the neural network model, wherein the addition of the extracted one or more samples is performed for re-training the neural network model; and repeating, at the computing device, above steps until the novelty of the new set of data samples is below a pre-defined threshold, wherein these iterations are performed for improving performance of the neural network model.

17. The non-transitory computer-readable storage medium as recited in claim 16, wherein the training data is received using random sampling from a dataset, wherein the random sampling comprising simple random sampling, stratified sampling, cluster sampling, multistage sampling, and systematic random sampling.

18. The non-transitory computer-readable storage medium as recited in claim 16, wherein the training data is received in one or more formats, wherein the one or more formats comprising at least one of metric data, text, images, videos, gif and animation.

19. The non-transitory computer-readable storage medium as recited in claim 16, wherein the new set of data samples is received in one or more formats, wherein the one or more formats comprising at least one of metric data, text, images, videos, gif and animation.

20. The non-transitory computer-readable storage medium as recited in claim 16, wherein the training data is received from one or more sources, wherein the one or more sources comprising at least one of an enterprise data source, IOT devices, an application, a third-party database, one or more online knowledgebase, one or more offline knowledgebase, an input device, a scanner, and a hardware computing device.

* * * * *